(12) United States Patent
Demetrius et al.

(10) Patent No.: US 12,441,410 B2
(45) Date of Patent: Oct. 14, 2025

(54) VEHICLE FLOOR JOINTS

(71) Applicant: Honda Motor Co., Ltd., Tokyo (JP)

(72) Inventors: Carlington George Demetrius, Dublin, OH (US); Yoshiaki Ikeda, Takanezawa-machi (JP); Yuze Li, Tochigi (JP); Hiroaki Taniguchi, Royal Oak, MI (US); Yuichiro Umeda, Novi, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 18/068,180

(22) Filed: Dec. 19, 2022

(65) Prior Publication Data

US 2024/0199136 A1    Jun. 20, 2024

(51) Int. Cl.
*B62D 25/20* (2006.01)
*B60R 13/02* (2006.01)

(52) U.S. Cl.
CPC ............. *B62D 25/20* (2013.01); *B60R 13/02* (2013.01)

(58) Field of Classification Search
CPC .......... B60N 3/04; B60N 3/042; B60N 3/044; B60N 3/046; B60N 3/048; B62D 25/02; B62D 25/2054
USPC ...................... 296/97.23, 191, 193.07, 184.1
See application file for complete search history.

(56) References Cited

U.S. PATENT DOCUMENTS

| | | | |
|---|---|---|---|
| 1,953,991 A | 4/1934 | Schjolin | |
| 2,191,526 A | 2/1940 | Flogaus | |
| 6,451,444 B1 | 9/2002 | Ollila et al. | |
| 6,497,937 B1 | 12/2002 | Lam et al. | |
| 6,572,054 B1 | 6/2003 | Smallhorn | |
| 7,461,888 B2 | 12/2008 | Brown | |
| 7,674,495 B2 | 3/2010 | Pardo et al. | |
| 10,259,199 B2 | 4/2019 | Beuchel et al. | |
| 10,480,120 B2 | 11/2019 | Guyot et al. | |
| 11,090,899 B2 | 8/2021 | Park et al. | |
| 11,608,119 B2 * | 3/2023 | Kim | B23K 11/11 |
| 2002/0168503 A1 | 11/2002 | Dong et al. | |
| 2006/0080941 A1 | 4/2006 | Ishii et al. | |
| 2011/0006562 A1 * | 1/2011 | Campbell | B60R 13/01 296/193.04 |
| 2012/0301727 A1 | 11/2012 | Kim et al. | |

(Continued)

FOREIGN PATENT DOCUMENTS

| | | |
|---|---|---|
| CN | 1840838 B | 4/2010 |
| CN | 203511664 U | 4/2014 |
| CN | 205022586 U | 2/2016 |

(Continued)

OTHER PUBLICATIONS

De102016101548 text (Year: 2022).*

(Continued)

*Primary Examiner* — Dennis H Pedder
(74) *Attorney, Agent, or Firm* — Plumsea Law Group, LLC

(57) ABSTRACT

A vehicle floor system includes a floor garnish disposed in a cabin of a vehicle, wherein the floor garnish comprises a first peripheral edge, and a center floor disposed in the cabin area of the vehicle, the center floor comprising a second peripheral edge, wherein the second peripheral edge is on the first peripheral edge, and the first peripheral edge and the second peripheral edge form a joint between the floor garnish and the center floor.

16 Claims, 5 Drawing Sheets

(56) References Cited

U.S. PATENT DOCUMENTS

| | | | |
|---|---|---|---|
| 2016/0207283 A1 | 7/2016 | Wang et al. | |
| 2018/0311931 A1 | 11/2018 | Wodzinski et al. | |

FOREIGN PATENT DOCUMENTS

| | | | | |
|---|---|---|---|---|
| CN | 103523115 B | 3/2016 | | |
| CN | 207931818 U | 10/2018 | | |
| CN | 208069836 U | 11/2018 | | |
| CN | 208101817 U | 11/2018 | | |
| CN | 208914720 U | 5/2019 | | |
| CN | 209566987 U | 11/2019 | | |
| CN | 210555173 U | 5/2020 | | |
| CN | 210793367 U | 6/2020 | | |
| CN | 113040585 A | 6/2021 | | |
| CN | 214930127 U | 11/2021 | | |
| CN | 214985682 U | 12/2021 | | |
| CN | 216401563 U | 4/2022 | | |
| DE | 3417321 | 11/1985 | | |
| DE | 202006009081 U1 | 8/2006 | | |
| DE | 202008016032 U1 | 4/2010 | | |
| DE | 102016101548 B4 * | 7/2022 | | B60N 3/044 |
| EP | 0522240 B1 | 11/1996 | | |
| EP | 3006260 A1 | 4/2016 | | |
| EP | 3210833 A1 | 8/2017 | | |
| FR | 2909351 A1 * | 6/2008 | | B62D 25/025 |
| GB | 2200600 A | 8/1988 | | |
| JP | 2006103403 A | 4/2006 | | |
| JP | 3830684 B2 | 10/2006 | | |
| JP | 4679206 B2 | 4/2011 | | |
| JP | 5316604 B2 | 10/2013 | | |
| JP | 2016074368 A | 5/2016 | | |
| JP | 2016089483 A | 5/2016 | | |
| JP | 2021095737 A | 6/2021 | | |
| KR | 20100025723 A | 3/2010 | | |

OTHER PUBLICATIONS

FR2909351 text (year 2008).*

First Office Action, Japanese Patent Application No. 2023-178754, Dec. 17, 2024, 10 pp.

Second Office Action, Japanese Patent Application No. 2023-178754, Mar. 25, 2025, 4 pp.

Non-Final Office mailed Mar. 3, 2025, U.S. Appl. No. 18/067,953, 12 pp.

Non-Final Office mailed Apr. 3, 2025, U.S. Appl. No. 18/067,953, 17 pp.

* cited by examiner

VEHICLE FLOOR JOINTS

BACKGROUND

The present disclosure relates to a vehicle floor system, and more particularly to joints between floor garnishes.

Generally, vehicles are trimmed in a mixture of fabrics, vinyl, leather, and wood. Floor materials are generally fabric mats or vinyl coverings, which are permanently installed using plastic rivets, weather stripping, and metal brackets, such as a frame of a car seat.

These floor materials are generally permanently fixed to an interior of the vehicle. For example, floor materials may be held in place by a mixture of weather stripping, clips, and vehicle seats. Removal and/or replacement of the floor materials can be complicated by the need to remove various additional components, such as the vehicle seats, which may be bolted in place.

There is a need in the art for improved joints between floor components of a vehicle.

SUMMARY OF THE INVENTION

The present disclosure is directed to improvements in vehicle flooring. In one aspect, a vehicle floor system includes a center floor and perimeter floor garnishes. In some aspects, the center floor overlaps portions of perimeter floor garnishes, such that joints between the center floor and the perimeter floor garnishes have no gap.

In one or more aspects, a vehicle floor system includes a floor garnish disposed in a cabin of a vehicle, wherein the floor garnish comprises a first peripheral edge, and a center floor disposed in the cabin area of the vehicle, the center floor comprising a second peripheral edge, wherein the second peripheral edge is on the first peripheral edge, and the first peripheral edge and the second peripheral edge form a joint between the floor garnish and the center floor.

In some aspects, a vehicle floor system includes a center floor in a cabin area of a vehicle, the center floor comprising a first peripheral edge portion and a second peripheral edge portion, a front floor garnish disposed in the cabin of the vehicle, wherein the front floor garnish comprises a first peripheral edge, and a rear floor garnish disposed in the cabin of the vehicle, wherein the rear floor garnish comprises a second peripheral edge, wherein the center floor is between the front floor garnish and the rear floor garnish, and the first peripheral edge portion is on the first peripheral edge and the second peripheral edge portion is on the second peripheral edge.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

There is a need in the art for an improved vehicle flooring system. In one aspect, a plurality of brackets locate a removeable center floor on a structure of a vehicle. In at least some aspects, a battery may be located under the structure of the vehicle and the center floor is removeable to enable access to the battery. According to some aspects, additional perimeter floor garnishes are disposed flush with the center floor. The perimeter floor garnishes may be removeable.

Figure 1:
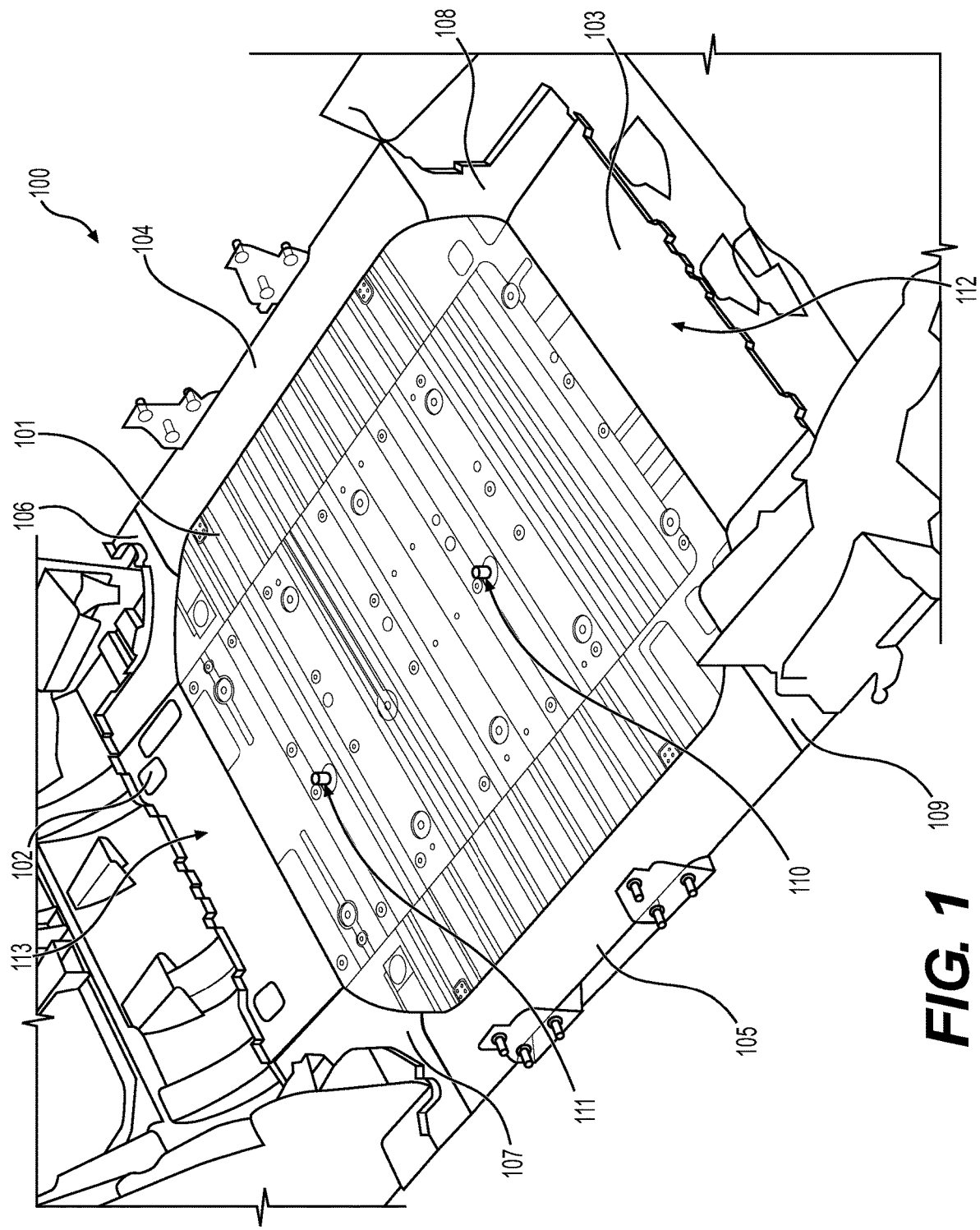
FIG. 1 illustrates an embodiment of a vehicle floor assembly according to some embodiments.

FIG. 1 illustrates an embodiment of a vehicle floor assembly 100 according to some embodiments. According to some embodiments, the vehicle floor assembly 100 includes a center floor 101. The center floor 101 may be a floor covering exposed to an interior of the vehicle, where a passenger may walk on the center floor 101 and/or place packages or bags on the center floor 101. An area covered by the center floor 101 may be a cabin area.

In some examples, the center floor 101 may be made of a wood material, a laminate material, or a composite material. The center floor 101 is a generally stiff and durable material selected for passenger accommodation. For example, the vehicle may be a public transportation vehicle or a ride-sharing vehicle having high levels of passenger accommodation.

A plurality of perimeter floor garnishes may complete a floor of the vehicle. The plurality of perimeter floor garnishes may include lateral garnishes. The lateral garnishes may include a rear area garnish 102, a front area garnish 103, a left garnish 104, and a right garnish 105. The rear area garnish 102 may be disposed below a rear passenger seat (not shown) in the cabin area of the vehicle. The front area garnish 103 may be disposed below a front passenger seat in the cabin area of the vehicle.

In some examples, the perimeter floor garnishes may be made of a plastic material. The perimeter floor garnishes are not limited to plastic materials, and other materials may be used. For example, the perimeter floor garnishes may be made of a some or a different material as the center floor 101.

In one example, the rear passenger seat and the front passenger seat may face one another, such that the center floor 101 extends between a front passenger seat area 112 and a rear passenger seat area 113, and the center floor 101 is the flooring of a passenger area of the vehicle. In some aspects, at least one of the left garnish 104 and the right garnish 105 is disposed in an area adjacent to a door of the vehicle.

The plurality of perimeter floor garnishes may further include corner area garnishes. The corner area garnishes may include a rear-left garnish 106, a rear-right garnish 107, a front-left garnish 108, and a front-right garnish 109. The corner area garnishes may fill areas between the lateral garnishes.

According to some aspects, a top surface of the center floor 101 is flush with an upper surface of the rear area garnish 102 and an upper surface of the front area garnish 103. Flush joints in the vehicle floor assembly 100 may help a passenger to easily slide packages or bags under a seat. In some aspects, the center floor overlaps portions of perimeter floor garnishes, such that joints between the center floor and the perimeter floor garnishes have no gap exposing an underlying structure of the vehicle, for example, structure 201 in FIG. 2.

Figure 2:
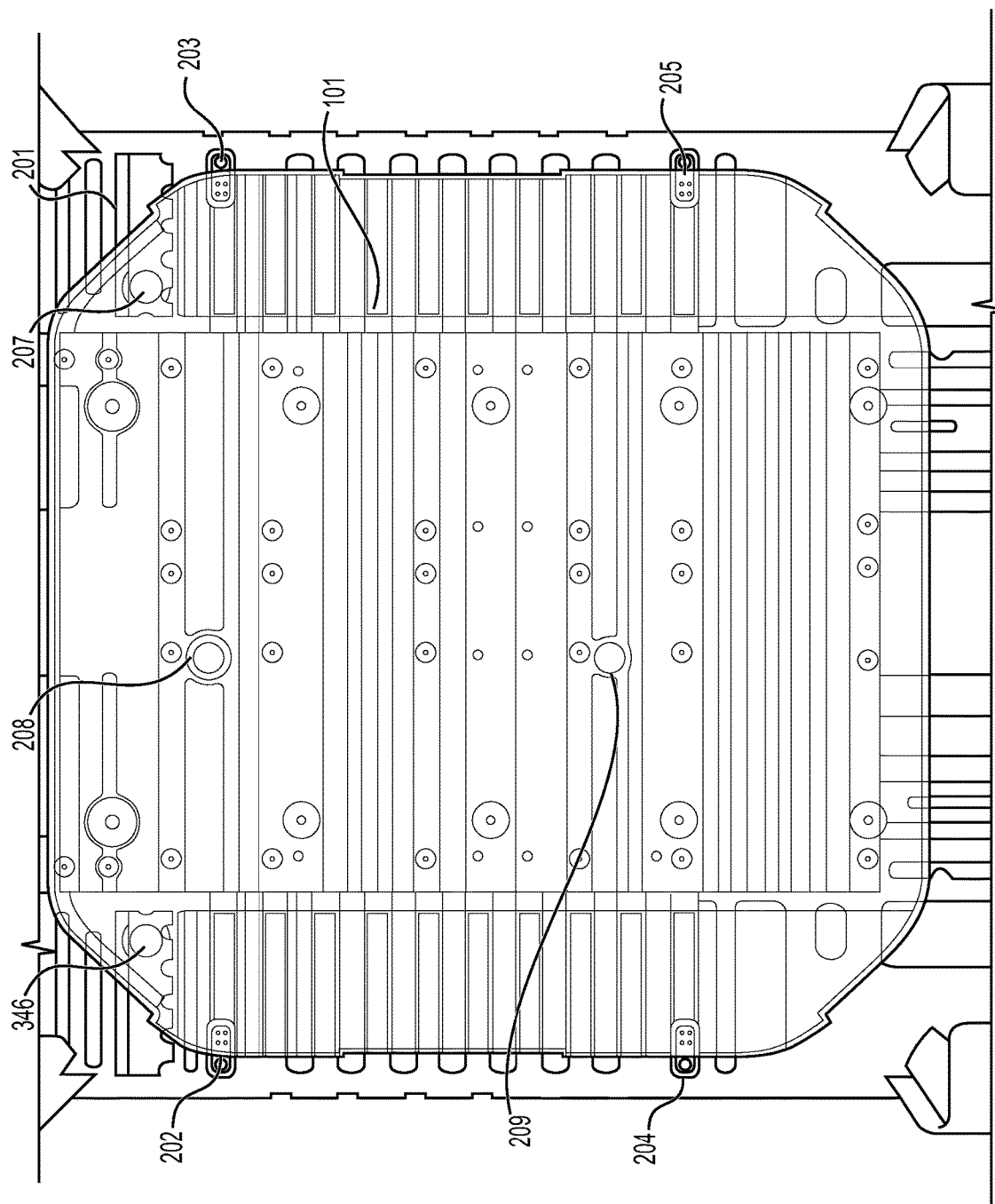
FIG. 2 illustrates an embodiment of a center floor having brackets according to some embodiments.

FIG. 2 illustrates an embodiment of a center floor located on a structure of a vehicle by metal brackets according to some embodiments. The vehicle includes a structure 201, which may be a part of a monocoque of the vehicle, a floor pan of the vehicle, or an access panel of the vehicle. The structure 201 may be formed from a metal such as aluminum, steel, or magnesium. The structure 201 is not limited to these materials, and other materials may be used.

The center floor 101 may be connected to the structure by one or more brackets, In FIG. 2, the center floor 101 is located by a first bracket 202, a second bracket 203, a third bracket 204, and a fourth bracket 205. Each bracket is connected to an underside of the center floor 101 that faces the structure 201. Each bracket includes a means for fixing the center floor 101 to the structure 201 of the vehicle.

The center floor 101 and/or the structure 201 of the vehicle include one or more locator structures. The locator structures may ensure proper alignment of the center floor 101 and the brackets to the structure 201 of the vehicle. In one example, the locator structures include a first locator pin 206, a second locator pin 207, a third locator pin 208, and a fourth locator pin 209 align the center floor 101 and the brackets to the structure 201 of the vehicle. The locator pins may have various shapes. For example, the fourth locator pin 209 may be an oval shaped pin 110 (see FIG. 1) extending from the structure 201 of the vehicle to a corresponding slot in the center floor 101. In another example, the third locator pin 208 may be a round shaped pin 111 (see FIG. 1) extending from the structure 201 of the vehicle to a corresponding hole in the center floor 101.

Figure 3:
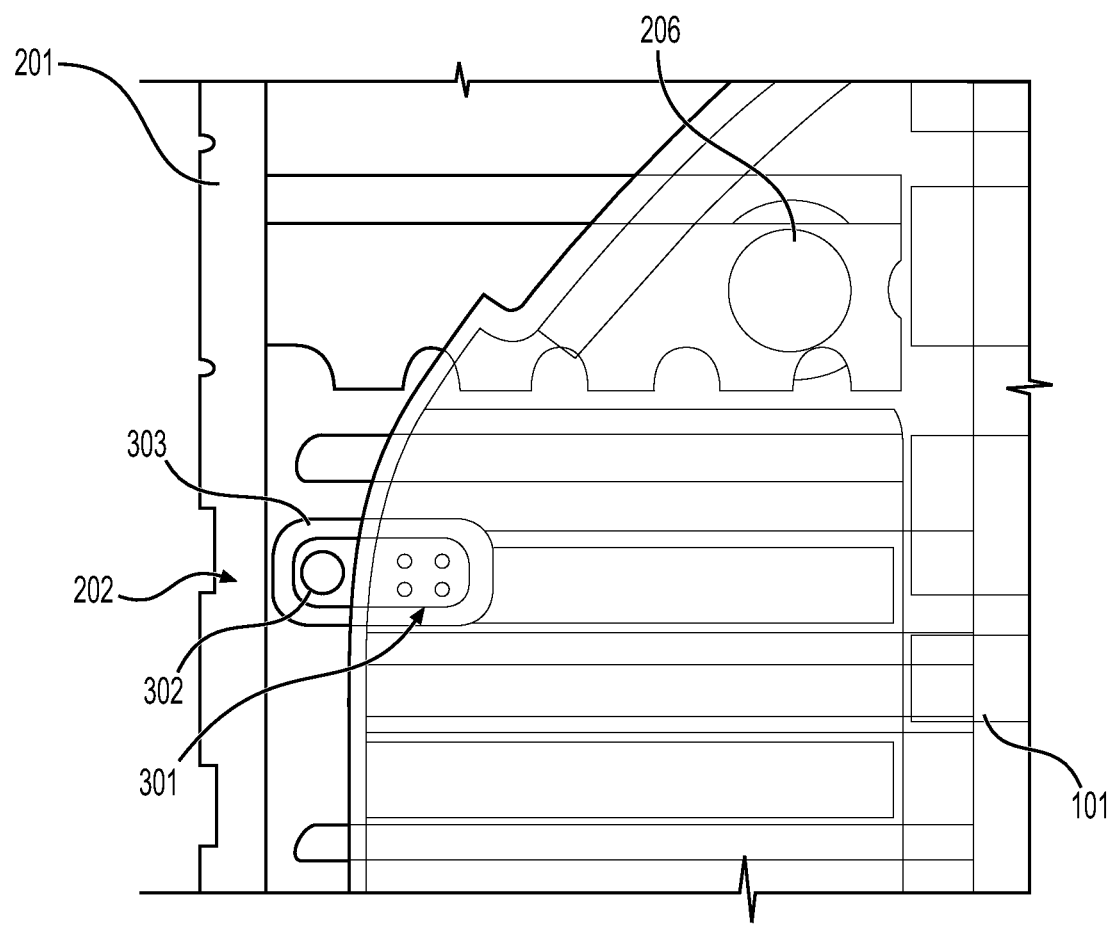
FIG. 3 illustrates an embodiment of a center floor having a bracket and a locator structure and installed on a structure of the vehicle according to some embodiments.

FIG. 3 illustrates an embodiment of a center floor located by a bracket and a locator pin on a structure of the vehicle according to some embodiments. As illustrated the first locator pin 206 may ensure proper alignment of the center floor 101 and the first bracket 202 to the structure 201 of the vehicle. The first bracket 202 may be formed of a metal material. According to some aspects, the first bracket 202 is connected to the center floor 101. The connection of the first bracket 202 and the center floor 101 may by a fixing device 301. The fixing device 301 may include screws, bolts, rivets, adhesive, or a bonded structure. The first bracket 202 may be fixed to the structure 201 of the vehicle by a mechanical fastener 302. The mechanical fastener 302 may include a screw or bolt. The first bracket 202 may include a raised perimeter 303 that may directly support the center floor 101 and the right garnish 105 (not shown in FIG. 3).

According to some aspects, one or more of the perimeter garnishes abutted the center floor 101 and cover a portion of at least one of the brackets extending beyond an edge of the center floor 101. For example, the left garnish 104 and the right garnish 105 may be installed in the vehicle after the center floor 101 is fixed to the structure 201, such that the left garnish 104 and the right garnish 105 cover portions of the brackets that extending beyond an edge of the center floor 101 and that receive the mechanical fastener 302 to secure the center floor 101. According to at least one embodiment, the left garnish 104 and the right garnish 105 and directly supported by portions of the raised perimeters of the brackets extending beyond an edge of the center floor 101.

Figure 4:
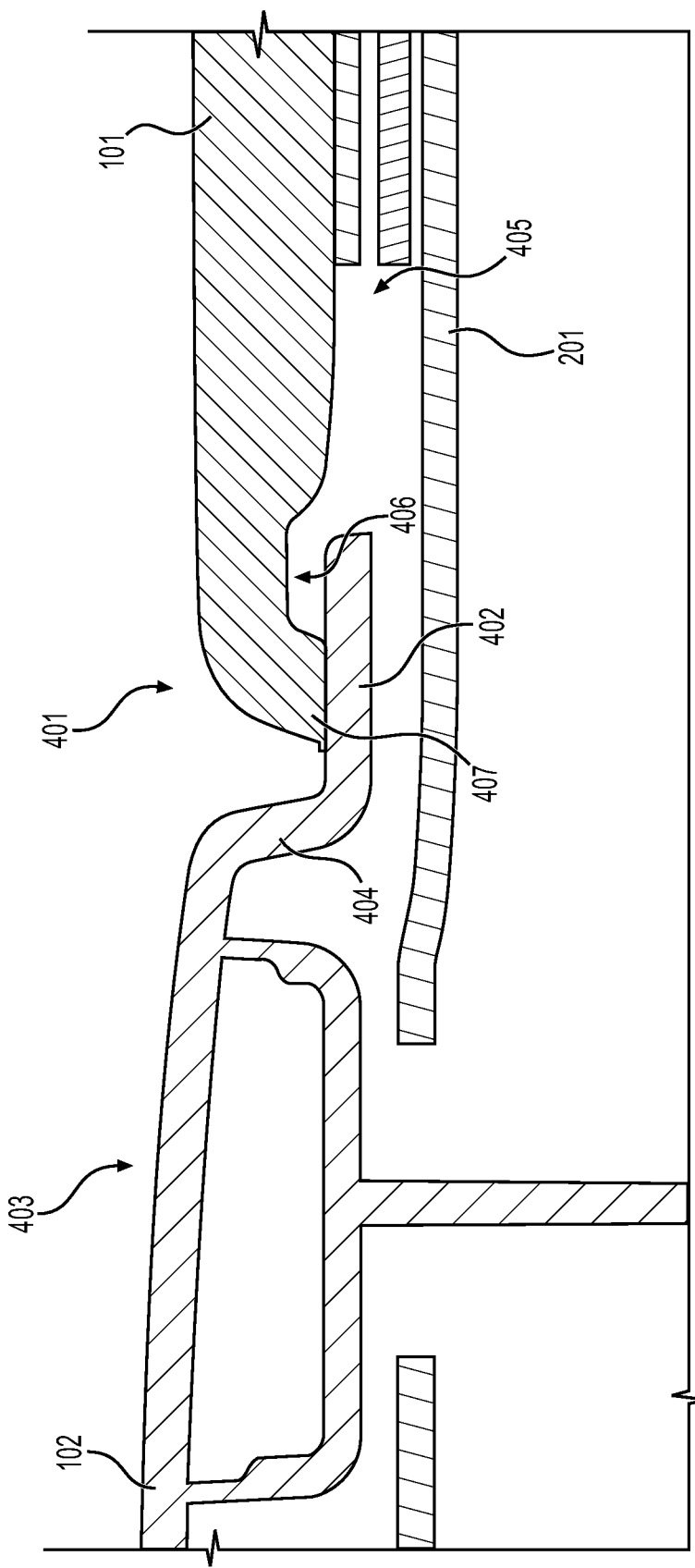
FIG. 4 illustrates an embodiment of a center floor and a perimeter floor garnish according to some embodiments.

FIG. 4 illustrates an embodiment of a center floor and a perimeter floor garnishes according to some embodiments. The center floor 101 and at least a portion of the rear area garnish 102 are disposed over the structure 201 of the vehicle. An upper peripheral edge 401 of the center floor 101 is disposed above a lower peripheral edge 402 of the rear area garnish 102. Accordingly, a half-lap joint is formed between the upper peripheral edge 401 of the center floor 101 and the lower peripheral edge 402 of the rear area garnish 102, such that there is no gap between the center floor 101 and the rear area garnish 102. The center floor 101 and the front area garnish 103 may be similarly arranged having a half-lap joint.

The rear area garnish 102 includes an upper, generally planar, surface 403, and an intermediate surface 404 extending downward from the upper surface to the lower peripheral edge 402 of the rear area garnish 102. The intermediate surface 404 may be substantially vertical in orientation. The front area garnish 103 may be similarly arranged, having an upper, generally planar, surface, and a joint surface extending downward to a peripheral edge of a perimeter garnish as illustrated in FIG. 4 and FIG. 5.

Figure 5:
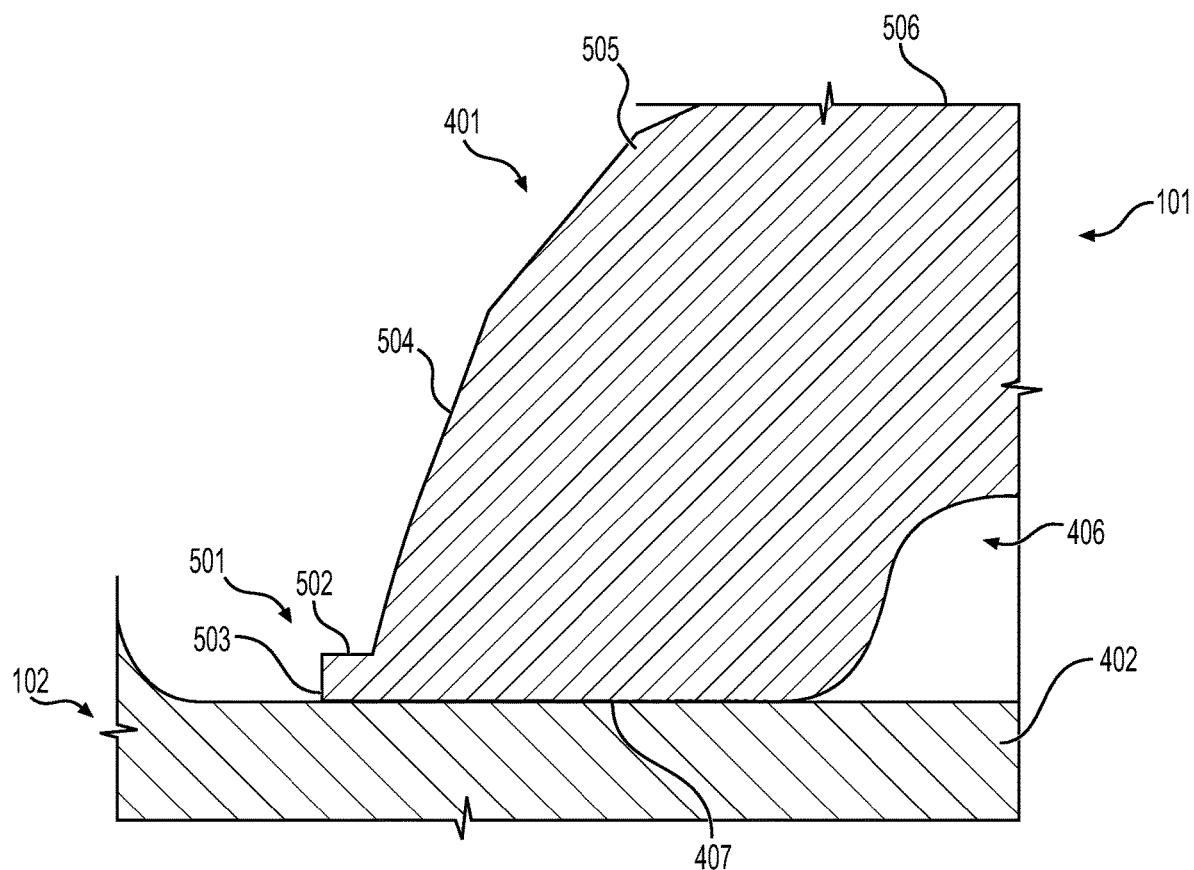
FIG. 5 illustrates an embodiment of a center floor and a perimeter floor garnish according to some embodiments.

Similarly, the rear-left garnish 106, the rear-right garnish 107, the front-left garnish 108, and the front-right garnish 109 may be similarly arranged, having an upper, generally planar, surface, and a joint surface extending downward to a peripheral edge of a perimeter garnish as illustrated in FIG. 4 and FIG. 5. That is, the upper peripheral edge 401 of the center floor 101 is disposed above a peripheral edge of each of the corner area garnishes.

According to some aspects, the center floor 101 further includes a horizontal lower surface 405 and an undercut portion 406 between the horizontal lower surface and the second peripheral edge. The undercut portion 406 may be a concave portion of the horizontal lower surface 405 of center floor 101 located between a main floor garnish and the upper peripheral edge 401 of the center floor 101. Further, the upper peripheral edge 401 of the center floor 101 may include an interface surface 407, that directed contacts the lower peripheral edge 402 of a floor garnish. The lower peripheral edge 402 of a floor garnish may extend into an area of the undercut portion 406, as illustrated in FIG. 4.

According to some aspects, the left garnish 104 and the right garnish 105 are installed after the center floor 101. The left garnish 104 and the right garnish 105 cover the brackets that secure the center floor 101. Since the left garnish 104, and the right garnish 105 are installed after the center floor 101, a joint between these garnishes may be a butt joint, a half-lap joint, or a tongue-and-grove joint, for example. FIG. 5 illustrates an embodiment of a center floor and perimeter floor garnishes according to some embodiments. The upper peripheral edge 401 of the center floor 101 is disposed above the lower peripheral edge 402 of the rear area garnish 102. The upper peripheral edge 401 of the center floor 101 may include a peripheral edge projection 501 having a horizontal top portion 502 and a vertical edge portion 503. The upper peripheral edge 401 of the center floor 101 may include an angled edge portion 504 extending from the horizontal top portion 502. A radius 505 may connect the angled edge portion 504 to a top surface 506 of the center floor 101.

According to some implementations, the horizontal top portion 502 of the peripheral edge projection 501 may be about 0.5 millimeters in length and the vertical edge portion 503 of the peripheral edge projection 501 may be about 0.5 millimeters in height. According to one example, the angled edge portion 504 has an angle of about 10-30 degrees, and more particularly 15 degrees, from the vertical. The radius 505 may be about 3-8 millimeters, and more particularly 5 millimeters.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

We claim:

1. A vehicle floor system comprising:
a floor garnish disposed in a cabin of a vehicle, wherein the floor garnish comprises a first peripheral edge; and
a center floor disposed in the cabin of the vehicle, the center floor comprising a second peripheral edge disposed at a front or rear of the center floor,
wherein the second peripheral edge is on the first peripheral edge, and the first peripheral edge and the second peripheral edge form a joint between the floor garnish and the center floor; and
wherein the second peripheral edge comprises:
an interface surface directly contacting the first peripheral edge of the floor garnish;
a peripheral edge projection having a horizontal top projection surface and a vertical edge projection portion, the vertical edge projection portion extending upward from the interface surface; and
an angled edge portion extending downward from a horizontal top surface of the center floor to the peripheral edge projection.

2. The vehicle floor system of claim 1, wherein the floor garnish comprises:
an upper surface; and
an intermediate surface extending downward from the upper surface to the first peripheral edge.

3. The vehicle floor system of claim 1, wherein the second peripheral edge of the center floor comprises a radius connecting the angled edge portion to the horizontal top surface of the center floor.

4. The vehicle floor system of claim 1, wherein the center floor comprises:
a horizontal lower surface; and
an undercut portion between the horizontal lower surface and the second peripheral edge.

5. The vehicle floor system of claim 1, wherein the first peripheral edge of the floor garnish extends in a generally horizontal direction.

6. The vehicle floor system of claim 1, wherein the floor garnish is a plastic material.

7. The vehicle floor system of claim 1, wherein the center floor is one of a wood material, a laminate material, and a composite material.

8. A vehicle floor system comprising:
a center floor in a cabin area of a vehicle, the center floor comprising a first peripheral edge portion and a second peripheral edge portion;
a front floor garnish disposed in the cabin of the vehicle, wherein the front floor garnish comprises a first peripheral edge; and
a rear floor garnish disposed in the cabin of the vehicle, wherein the rear floor garnish comprises a second peripheral edge,
wherein the center floor is between the front floor garnish and the rear floor garnish, and the first peripheral edge portion is on the first peripheral edge and the second peripheral edge portion is on the second peripheral edge; and
wherein the center floor comprises:
a horizontal lower surface;
a first undercut portion between the horizontal lower surface and the first peripheral edge portion; and
a second undercut portion between the horizontal lower surface and the second peripheral edge portion.

9. The vehicle floor system of claim 8, further comprising:
a rear-left garnish comprising a rear-left peripheral edge;
a rear-right garnish comprising a rear-right peripheral edge;
a front-left garnish comprising a front-left peripheral edge; and
a front-right garnish comprising a front-right peripheral edge,
wherein the center floor is between the rear-left garnish, the rear-right garnish, the front-left garnish, and the front-right garnish, and the first peripheral edge portion is on the front-left peripheral edge and the front-right peripheral edge, and the second peripheral edge portion is on the rear-left peripheral edge and the rear-right peripheral edge.

10. The vehicle floor system of claim 9, further comprising:
a left garnish along a left side of the center floor and between the rear-left garnish and the front-left garnish; and
a right garnish along a right side of the center floor and between the rear-right garnish and the front-right garnish.

11. The vehicle floor system of claim 10, wherein the left garnish and the right garnish cover a plurality of brackets connecting the center floor to the vehicle.

12. The vehicle floor system of claim 8, wherein the first peripheral edge portion comprises:
an interface surface directly contacting the first peripheral edge of the front floor garnish;
a peripheral edge projection having a horizontal top projection surface and a vertical edge projection portion, the vertical edge projection portion extending upward from the interface surface; and
an angled edge portion extending downward from a horizontal top surface of the center floor to the peripheral edge projection.

13. The vehicle floor system of claim 8, wherein the second peripheral edge portion comprises:
an interface surface directly contacting the second peripheral edge of the front floor garnish;
a peripheral edge projection having a horizontal top projection surface and a vertical edge projection portion, the vertical edge projection portion extending upward from the interface surface; and an angled edge portion extending downward from a horizontal top surface of the center floor to the peripheral edge projection.

14. The vehicle floor system of claim 8, wherein the first peripheral edge and the second peripheral edge extend in a generally horizontal direction.

15. The vehicle floor system of claim 8, wherein the front floor garnish and the rear floor garnish are a plastic material.

16. The vehicle floor system of claim 8, wherein the center floor is one of a wood material, a laminate material, and a composite material.

* * * * *